United States Patent
Lilja et al.

(10) Patent No.: US 6,600,903 B1
(45) Date of Patent: Jul. 29, 2003

(54) METHOD FOR DETERMINING SERVICE AVAILABILITY

(75) Inventors: Harri Lilja, Oulu (FI); Mikko Korpela, Raahe (FI); Jukka Vikstedt, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/456,262

(22) Filed: Dec. 7, 1999

(30) Foreign Application Priority Data

Dec. 14, 1998 (GB) ............................................ 9827503

(51) Int. Cl.$^7$ .............................................. H04B 17/00
(52) U.S. Cl. ...................................... 455/67.1; 370/328
(58) Field of Search ....................... 455/464, 62, 150.1, 455/151.1, 166.2, 67.7, 501, 67.1, 67.3, 522, 69; 370/328, 252

(56) References Cited

U.S. PATENT DOCUMENTS

| | | | | |
|---|---|---|---|---|
| 5,265,157 A | * | 11/1993 | Jolissaint et al. | 379/386 |
| 5,487,180 A | | 1/1996 | Ohtake | 455/54.1 |
| 5,528,664 A | * | 6/1996 | Skekys et al. | 379/452 |
| 5,613,213 A | * | 3/1997 | Naddell et al. | 455/363 |
| 5,640,677 A | * | 6/1997 | Karlsson | 455/434 |
| 5,732,328 A | * | 3/1998 | Mitra et al. | 455/522 |
| 5,784,360 A | | 7/1998 | I et al. | 370/252 |
| 5,915,214 A | * | 6/1999 | Reece et al. | 455/406 |
| 6,028,851 A | * | 2/2000 | Persson et al. | 370/329 |
| 6,128,371 A | * | 10/2000 | Hazama | 379/9.04 |
| 6,285,660 B1 | * | 9/2001 | Ronen | 370/259 |
| 6,289,009 B1 | * | 9/2001 | Sato | 370/342 |

FOREIGN PATENT DOCUMENTS

EP 0639896 A1 2/1995

OTHER PUBLICATIONS

Finnish Application No. 971927 (NC # 12757) pp. 1–16.

* cited by examiner

*Primary Examiner*—Nguyen T. Vo
*Assistant Examiner*—Nghi H. Ly
(74) *Attorney, Agent, or Firm*—Perman & Green, LLP

(57) ABSTRACT

A method of determining the availability of at least one of a plurality of different services in a wireless communication network comprising at least a first station and a second station which are in communication has the following steps. The pathloss between said first station and said second station is estimated, and based on the pathloss and the requirements of at least one of said services, the power with which said first station is required to transmit to said second station is determined. The required power is compared with the maximum power with which the first station is capable of transmitting.

26 Claims, 1 Drawing Sheet

METHOD FOR DETERMINING SERVICE AVAILABILITY

FIELD OF THE INVENTION

The present invention relates to a method for determining the availability of at least one of a plurality of different services.

BACKGROUND TO THE INVENTION

In wireless cellular telecommunication networks, the network is divided into a plurality of cells each of which is served by a base station. Each base station is arranged to communicate with mobile terminals in the cell associated with base station. Known networks are arranged to deal with different information rates. For example, some voice information services can require a lower rate as compared to certain types of data information services. Other types of data services may only require a lower rate than voice services, for example some types of packet services.

Code division multiple access (CDMA) systems have been proposed for cellular networks. For example, the IS-95 system in the USA uses code division multiple access. In these system a plurality of users in a given cell will use the same frequency at the same time. The users are distinguished by different spreading codes. When the number of users becomes large, interference between the users increases. This makes it harder to receive all the information correctly. Accordingly, a threshold is set and when the interference exceeds this level, no additional users are permitted to use the cell in question. If the threshold is too high, a CDMA system might become unstable. On the other hand, if the threshold is too low, the capacity of the network is unnecessarily reduced. In a cell, higher bit rates can be used nearer the base station as compared with at the cell boundaries as the power requirement is much lower nearer the base station as compared to at the cell edge. Data transmission can take place at different bit or information rates as discussed hereinbefore. When the bit rate is increased, the transmitted power needs to be increased in order to maintain the required quality.

In the third generation systems which are currently being proposed, it is envisaged that services other than just voice and data services may be provided. For example, data packet services and video information may also be transmitted and received. It has also been proposed that more than one application take place at the same time. For example a user may conduct a conversation at the same time that he sends a facsimile. The problems discussed hereinbefore will become of even more concern in these proposed third generation systems.

It is an aim of embodiments of the present invention to reduce or overcome these disadvantages.

By way of background, reference is made to Finish patent application No. 971927, in the name of the present applicant. This patent application relates to a proposed third generation systems such as UMTS (Universal Mobile Telecommunications System). In this proposed system, there are three or four different operating environments. These operating environments are: vehicular environment which utilises cells covering several kilometres; pedestrian environment which utilises cells covering hundreds of metres; office environment which utilises cells covering only a relatively few metres; and possibly the satellite environment which utilises cells which cover several hundreds of kilometres. These different environments may support different maximum data rates. For example, the maximum data rate supported by the vehicular environment may be less than that supported by the office environment. In practice these different cells may overlie one another so that a mobile station may be in different types of cells at the same time. The mobile terminal thus collects information about the service provided by each base station of these different cells. The mobile station predicts the type of service, including the data rate, which it will require in the next connection. The mobile terminal will be connected to cell which provides the predicted type of service. One main problem with the arrangement disclosed in this document is that the "end-user" does not know which services can be used at the user's location with respect to the base station with the current cell loading.

SUMMARY OF THE INVENTION

According to one aspect of the present invention, there is provided a method of determining the availability of at least one of a plurality of different services in a wireless communication network comprising at least a first station and a second station which are in communication, said method comprising the steps of estimating the pathloss between said first station and said second station, and based on said pathloss and the requirements of at least one of said services, determining the power with which said first station is required to transmit to said second station; and comparing said required power with the maximum power with which the first station is capable of transmitting.

Thus, in preferred embodiments of the present invention, a determination may be made as to the availability of a service before a connection using a particular service is attempted. A user may be able to determine whether or not a service might be available without using up network capacity in attempting to make a connection which will fail. The user may be provided with an indication of the available services.

Preferably, the method further comprises the step of determining if said first station is able to provide said service based on said comparing step.

The first station may be arranged to estimate the pathloss between said first and second stations. Preferably, the pathloss estimate is determined from information transmitted from the second station as to the power at which signals are transmitted from the second station and measurements at the first station as to the strength of signals received at the first station from the second station. The second station may transmit information to the first station as to the interference levels occurring in the signals received by the second station from the first station.

The determining step preferably takes into account the interference level occurring in transmissions between said first and second stations.

If the interference is taken into account, it may be determined whether or not the second station is able to support a given service. Information relating to the maximum permitted interference level for signals which are transmitted from the first station to the second station may be transmitted to the first station from the second station. The level of interference which would occur in the signals transmitted between the first and second station may be estimated from the current level of interference occurring in the signals transmitted between the first and second stations and the additional interference which would occur if the first station were to use one of said available services. Preferably, the current level of interference is obtained from information provided by the second station, The estimated level of interference may be compared with the maximum level of interference.

If the current level of interference between the first and second stations is the same as the maximum level of interference, then it is determined that none of the plurality of services are available.

The availability of services may be determined from the maximum power by determining the greatest level of service which can be provided. This then allows the user to select services have the determined greatest level or services having lower requirement levels.

An indication as to the availability of a given service may be provided by said first station. For example a suitable indication may be displayed on the display. The displayed availability may include a scale indicative of the level of service requirements which are available. Alternatively or additionally, the services which are available may be displayed. Preferably, said plurality of services have different minimum requirements. The at least one minimum requirement is taken into account when determining the availability of at least one service. The service requirements may include one or more of the following: bit rate and quality (eg, energy per bit requirement).

The information determined by the first station in the determining step may be used by the wireless communication network to calculate network requirements. The network requirements may comprise capacity requirements.

The first station may be a mobile station and the second station may be a base transceiver station. The wireless communication network may use code division multiple access. Embodiments of the present invention are particularly advantageous when used in conjunction with a CDMA network. Unnecessary attempts to use service may be avoided thus improving capacity. Embodiments of the present invention may be advantageous when used in conjunction with a TDMA network.

According to a second aspect of the present invention, there is provided a method of determining the availability of at least one of a plurality of different services having different requirements in a wireless communication network comprising at least a first station and a second station which are in communication, said method comprising the step of estimating the pathloss between said first station and said second station, and based on said pathloss and the maximum power with which the first station is capable of transmitting, determining the greatest service requirements which can be provided.

According to a third aspect of the present invention, there is provided a method of determining the availability of at least one of a plurality of different services in a wireless communication network comprising at least a first station and a second station which are in communication, said method comprising the step of estimating the interference in the signals transmitted between said first station and said second station, and based on the interference and the requirements of at least one of said services determining the power with which said first station is required to transmit to said second station; and comparing said required power with the maximum power with which the first station is capable of transmitting.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
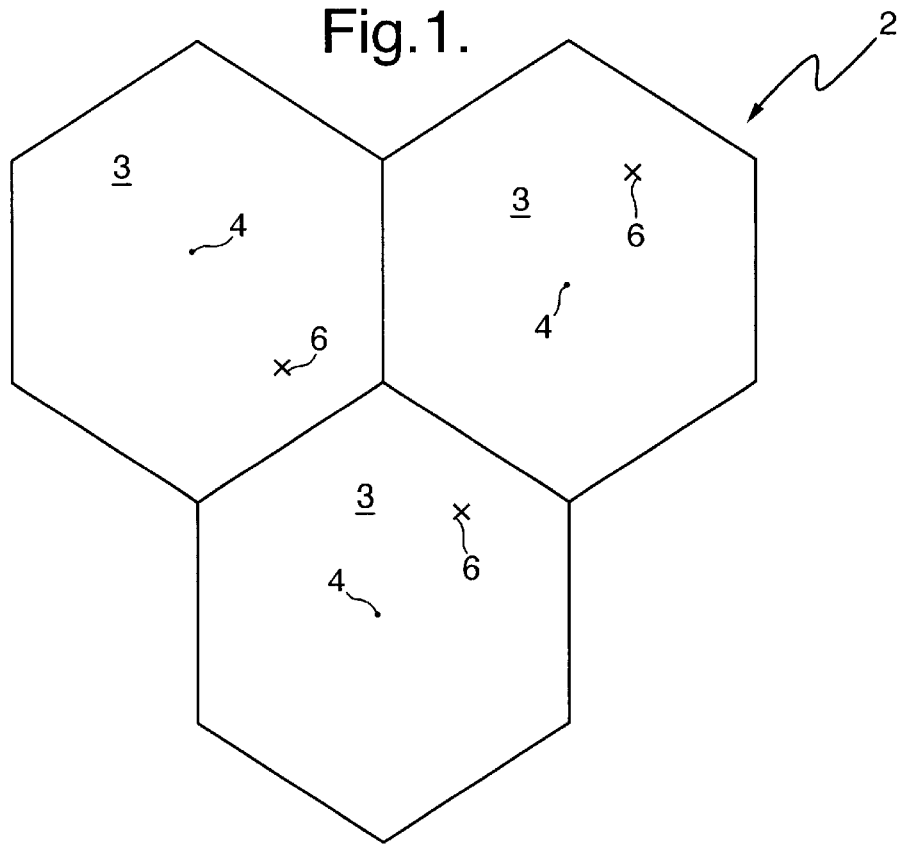
FIG. 1 shows a schematic diagram of a part of a wireless cellular network.

Reference will now be made to FIG. 1 which shows a wireless cellular network 2. The network 2 comprises a plurality of cells 3, each of which is served by a respective base transceiver station 4. Each base transceiver station is arranged to send radio signals to and receive radio signals from terminals 6 in the cell 3 associated with the respective base station 4. The terminals may be mobile or fixed terminals. For example the terminal may be a mobile telephone or a data communication device.

The embodiment of the present invention will be described in the context of a CDMA system. Thus all the terminals 6 in a given cell will use the same frequency range to communicate with the base station 4. The different users will be distinguished by different spreading codes. The users will be able to use a number of different services such as: data packet services; circuit switched data services; voice information services; and video information services. It is of course possible for additional services to be available. Likewise, fewer services may be available. Each of the available services has different quality requirements. The quality requirement could be percentage of bits which need to be correctly received in order to support the particular service. This effects the power requirements with which each bit should be transmitted. Thus if a cell is supporting a large number of users, it may not be possible for one type of service to be supported but it may be possible that another type of service can be supported. For example voice information services can be supported in cases where it is not possible to support other types of service.

The quality of service can also be defined in terms of the energy per bit to noise spectral density ratio with which each bit is to be received ($E_b/N_0$) In order to ensure that a bit is correctly received, the power at which that bit is transmitted is increased.

As will be described in more detail hereinafter, embodiments of the present invention are arranged to determine which services are available to a user, taking into account the different quality requirements of each service.

Figure 2:
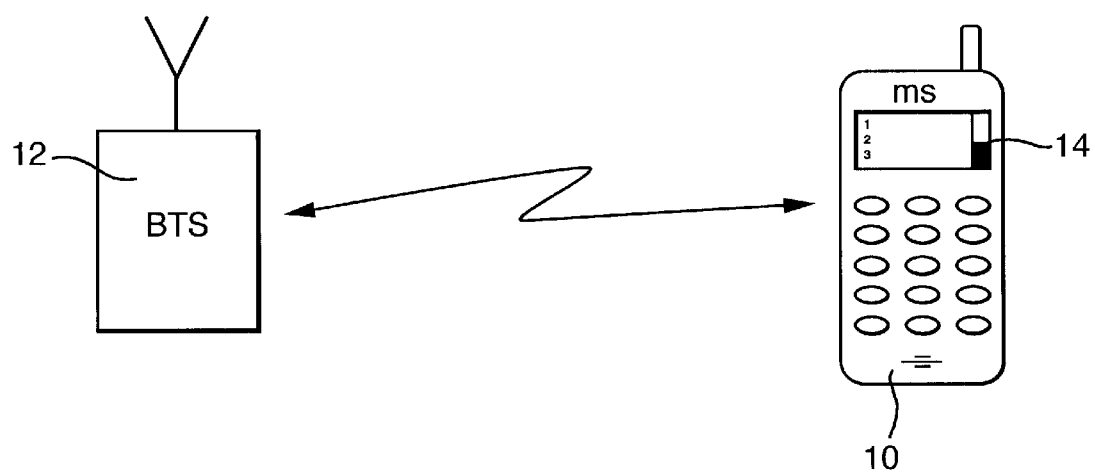
FIG. 2 shows a first embodiment of the present invention.

Reference is now made to FIG. 2 which schematically shows a mobile station 10 and a base station 12 which are in communication. The base station 12 transmits to the mobile station, via a control channel, information about the current power level used by the base station to transmit control signals to the mobile station and information about the interference level in the uplink. The uplink is the link from mobile stations to the base station 12.

The mobile station 10 estimates the path loss between that mobile station and the base station 12. The path loss represents the difference in the power level at which a signal is received by the mobile station as compared to the power level at which that signal was transmitted by the base station 12. Using the estimated path loss and the maximum power with which the mobile station is capable of transmitting at that time, the mobile station is able to determine the types of service which are available to the user. Alternatively or additionally, the mobile station provides an indication of the quality of service for each of the possible service options. In both cases, the mobile station will take into account the uplink interference level information provided by the base station 12. The uplink interference level is a measure of the cell load, that is the number of users in a cell, taking into account the type of service being used by each user. The user of the mobile station is then advised of the different services which are available and/or the quality of each of the possible services. Information on the available services and/or the quality of the possible services may be displayed on a display 14 of the mobile station.

The calculations which performed to provided this information will now be described in more detail hereinafter.

The signal to noise and interference ratio of the base station can be expressed as follows:

$$S/(N+I)=E_b/(TW(N_0+I_0))=E_bR/(W(N_0+I_0)) \quad (1)$$

where S is the received signal power from the mobile station in question and is equal to $E_b/T$;

N is the received power of white Gaussian thermal noise;

$N_0$ is the spectral density of the white Gaussian thermal noise N;

I is the uplink interference power;

$I_0$ is the spectral density of the uplink interference where the uplink interference I is assumed to be white Gaussian noise;

W is the spread signal band width;

$E_b$ is the bit energy;

R is the bit rate and equal to 1/T; and

T is the bit time.

If it is assumed that the power density of the thermal noise is negligible compared to the spectral density of uplink interference, that is $I_0 >> N_0$ Equation 1 then becomes:

$$S/I=E_bR/WI_0 \quad (2)$$

Rearranging equation 2 gives:

$$S=E_bRI/WI_0 \quad (3)$$

As $I/W=I_0$, then equation 3 becomes $$S=E_bRI_0/I_0=E_bR \quad (4)$$

The base station is arranged to use a broadcast channel BCCH to broadcast to the mobile station the transmission power of the Perch channel (a control channel) in dBm (0 dBm=1 mWatt and 30 dBm=1 Watt). The Perch channel includes a broadcast channel. The mobile station is then arranged to estimate the path loss $L_{Perch}$ of the Perch channel. The received signal power S at the base station of signals received from the mobile station can be expressed as:

$$S[dBm]=S_T[dBm]-L_{Perch}[dB] \quad (5)$$

where $S_T$ is the mobile station transmission power.

The mobile station 10 knows the $E_b/N_0$ values required for each different service in order to achieve the required quality. It can be assumed that the required $E_b/I_0$ is the same as $E_b/N_0$. The base station informs the mobile station via the BCCH channel of the uplink interference power density $I_0$ for the cell using 6 bits. Other numbers of bits can of course be used in alternative embodiments of the invention. The mobile station then calculates the necessary transmission power for each type of service by using the expression:

$$S_T[dBm]=E_b/N_0[dB]+RI_0[dBm]+L_{Perch}[dB] \quad (6)$$

To recap, $S_T[dBm]$ is the necessary mobile transmission power for a given service, $E_b/N_0[dB]$ is ratio of the bit energy to the spectral density of the white noise, $RI_0[dBm]$ is the bit rate for the given service multiplied by the uplink interference power density received at the base station and Lperch [dB] is the path loss between the base station and the mobile station.

Using equation 6, the mobile station, when actively on and not in a sleep or standby mode, constantly compares for each different service the required transmission power to the maximum available transmission power which can be provided by the mobile station. If the required transmission power is greater than the maximum power which can be provided by the mobile station, then the mobile station concludes that the availability of that service is poor. If, on the other hand, the mobile station concludes that the required transmission power is less than the maximum power which the mobile station can provide, then the mobile station concludes that the service availability is good.

The mobile station then advises the user, for example by displaying information on its display 14, as to which services satisfy the second criteria and are accordingly available.

The display 14, as shown in FIG. 2, include a scale which lists the available services in order of quality requirements. The display 14 indicates up to which level of service is available. In the example shown in FIG. 2, the mobile station is able to support the two lower quality services but not the higher quality service.

A modification to the embodiment shown in FIG. 2 will now be described. The embodiment of FIG. 2 takes into account the capability of the mobile station to support a given service. However no account is taken of the ability of the base station to support a given service with the required quality. If the base station is not able to support a given service with the required quality, the user would be unable to make the required connection. The modification which will now be described takes into account the capability of the base station to support a given service so that a user does not have the inconvenience of trying to make a connection which is then unsuccessful. In this embodiment, the base station 12 transmits, via the control channel the same information as is transmitted in the embodiment shown in FIG. 2. However, the base station 12 additionally transmits information as to the maximum allowed uplink interference level.

The mobile station 10 performs the same calculations as in the embodiment of FIG. 2. Thus the mobile station estimates the path loss and the availability of the different services.

In the modification to the embodiment of FIG. 2, the base station is arranged to advise the mobile station of the maximum uplink interference level $I_{0max}$ that the base station can handle when the base station is at maximum capacity. The base station 12 uses the BCCH channel to inform the mobile station 10 of this information. This information is defined in dBm/Hz using 6 bits of the BCCH channel. With this additional information, the mobile station is able to check whether its proposed transmission power for a proposed service causes too much interference in the uplink. If so, the mobile station will not even try to use that service. However it is possible that a service with a lower quality requirement would not cause too much interference and so could be used.

The mobile station thus uses equation 6 as with the first embodiment. The mobile station therefore calculates the necessary transmission power for each different service and then compares the calculated values with the maximum power with which the mobile station is able to transmit. For those services which the mobile station is able to support, the following further calculations are carried out to see if the base station is able to support those services. First the mobile station calculates the power level of the signal which would be received by the base station if the mobile terminal were to transmit with the required power level for a given service. The mobile station uses equation 5 for this purpose where S represents the power level of the signal received at the base station, $S_T$ is the transmission power used by the mobile station calculated using equation 6, and $L_{Perch}$ is the path loss between the mobile station and the base station.

The mobile station then calculates the new uplink interference spectral density which would occur if the mobile station were to use a given service. This is given by the following equation:

$$I_{0new} = I_{0old} + S/W \quad (7)$$

where $I_{0new}$ is the new uplink spectral density;

$I_{0old}$ is the old uplink spectral density information which is transmitted from the base station to the mobile station; and S/W is the contribution to the spectral density if the mobile station were to use a given service with S being the power level of the signal which would be received at the base station and W is the spread signal bandwidth.

The new uplink spectral density $I_{0new}$ is then compared to the maximum uplink spectral density permitted $I_{0max}$. If the new spectral density $I_{0new}$ is greater than the maximum permitted spectral density $I_{0max}$ the user is advised that the service in question is not available. If, on the other hand, the new spectral density $I_{0new}$ is less the maximum permitted spectral density $I_{0max}$ then the user is advised that the given service is available.

It should be appreciated that if the current uplink interference is the same as the maximum interference level, then no further calculations need to be carried out as the cell is at capacity limit and that no further connections are possible.

The final decision as to whether or not a given user is permitted to use a given service will be made in the base station and/or in a radio network controller. However, embodiments of the present invention allow the user to request access to a given service when it is likely that such a service could be supported. The user may be prevented from requesting access to a service where that service is unlikely to be supported. Alternatively, the user would not be prevented from requesting access to any service, but where it is likely that such a request is likely to be denied for the reasons discussed hereinbefore, a warning message could be displayed or an audible warning sound made. Even if a service is indicated as being supportable, in practice that service may not be supportable. This is because no account is taken of downlink capacity. However in embodiments of the present invention, the downlink capacity availability could be taken into account when advising a user of the availability of a service and/or the quality thereof.

The modification to the embodiment of FIG. 2 has the advantage that a user does not waste time trying to establish connections which are unsupportable by the base station and in that unnecessary interference caused by a user trying to a make such a connection will be avoided. This is particularly advantageous in a CDMA system which is interference limited.

The embodiments which are described are in the context of a network having cells. However it should be appreciated that embodiments of the present invention are also applicable to networks which include cell sectors. Each cell sector shares a common base station location with an adjacent cell sectors. Typically one base station location will include three base stations which serve three sectors. Whilst separate base stations may be provided, there may be some sharing of components and all three base stations may be considered as a single entity.

In an alternative embodiment of the invention, the mobile station is arranged to calculate the maximum bit rate which can be supported. The user can then select a service in accordance with this calculated value.

In a modification to the embodiments described hereinbefore, the estimates can be used by the network instead of or as well as by the mobile station. The network can use a power margin estimate which is the difference between the maximum transmission power of the mobile station and the required transmission power for the required service. The power margin estimate would be calculated by the mobile station and transmitted to the network. The network is able to use this information in network loading calculations and capacity allocations to mobile stations. In these calculations, the quality of service requirements, for example the bit rate and $E_b/N_0$ requirement, used by the mobile station can be some predetermined values known by the network. The mobile terminal would thus calculate the power margin estimates based on the same bit rate and $E_b/N_0$ requirement and these power margin estimates would be sent to the network. The bit rate and $E_b/N_0$ requirement are determined by the network. This information could be used in packet data services or in normal circuit switched services. A network controller 16 which is connected to each base station 4 can use the power margin estimate. The network controller uses this power margin value to estimate the maximum bit rate which can be allocated to the mobile station on the uplink without the mobile station running out of power. The network controller function can alternatively be performed in each base station.

The embodiments of the present invention described hereinbefore have been described in the context of a CDMA system. However, it should be appreciated that embodiments of the present invention can be used in the context of any other suitable systems such as a TDMA (Time Division Multiple Access) system, a FDMA (Frequency Division Multiple Access) system, a SDMA (Space Division Multiple Access) system as well as hybrids thereof.

In a TDMA system the base station does not need to send information about the received uplink interference level. In a range limited cell it can be approximated that the mobile station is the only one using that frequency band. Therefore, it is enough for the mobile station to estimate the pathloss between the base station and mobile station, and use that information to determine the availability of at least one of the plurality of different services.

In a range limited TDMA system the mobile station calculates the necessary transmission power for each type of service by using the expression:

$$St[dBm] = S/N[dB] + (Wtdma*No)[dBm] + Lbcch[dB],$$

where S/N is the required signal to noise ratio measured at the base station for a given service, Wtdma is the bandwidth, Lbcch is the pathloss of a broadcast control channel (BCCH) between the base station and the mobile station, and the other parameters are as defined hereinbefore. In an interference limited TDMA system, i.e., system with small cell sizes, an addition margin of 3 dB can be added to the required S/N value. The mobile station, which has estimated the necessary transmission power by using the equation set out hereinbefore can then use that information to determine the availability of given service.

What is claimed is:

1. A method of determining the availability of at least one of a plurality of different services having different requirements in a wireless communication network comprising at least a first station and a second station which are in communication, said method comprising the step of:

estimating the pathloss between said first station and said second station, and based on said pathloss and the maximum power with which the first station is capable of transmitting, determining the greatest service requirements which can be provided.

2. A method as claimed in claim 1, further comprising the step of:

determining if said first station is able to provide said service based on said determining step.

3. A method as claimed in claim 1 wherein said first station is arranged to estimate the pathloss between said first and second stations.

4. A method as claimed in claim 3, wherein the pathloss estimate is determined from information transmitted from the second station as to the power at which signals are transmitted from the second station and measurements at the first station as to the strength of signals received at the first station from the second station.

5. A method as claimed in claim 1 wherein the second station transmits information as to the interference levels occurring in the signals received by the second station from the first station.

6. A method as claimed in claim 1, wherein the determining step takes into account the interference level occurring in transmissions between said first and second stations.

7. A method as claimed in claim 6, wherein information relating to the maximum permitted interference level for signals which are transmitted from the first station to the second station is transmitted to the first station from the second station.

8. A method as claimed in claim 1, wherein the level of interference which would occur in the signals transmitted between the first and second station is estimated from the current level of interference between the first and second stations and the additional interference which would occur if the first station were to use one of said available services.

9. A method as claimed in claim 8, wherein the current level of interference is obtained from information provided by the second station.

10. A method as claimed in claim 8, wherein said level of interference is compared with a maximum level of interference.

11. A method as claimed in claim 10, wherein if the level of interference between the first and second stations is the same as the maximum level of interference, then it is determined that none of the plurality of services are available.

12. A method as claimed in claim 1, wherein an indication as to the availability of a given service is provided by said first station.

13. A method as claimed in claim 12 wherein the availability of a given service is displayed by said first station on a display thereof.

14. A method as claimed in claim 13, wherein said display includes a scale indicative of the level of service requirements which are available.

15. A method as claimed in claim 1, wherein said plurality of services have different minimum service requirements.

16. A method as claimed in claim 15, wherein at least one minimum service requirement is taken into account when determining the availability of at least one service.

17. A method as claimed in claim 15, wherein said service requirements include one or more of the following: bit rate; and quality.

18. A method as claimed in claim 1, wherein information determined by the first station in the determining step is used by the wireless communication network to calculate network requirements.

19. A method as claimed in claim 18, wherein a power margin estimate is calculated from the difference between the maximum power and the required power and said power margin estimate is used by said wireless communication network to calculate network requirements.

20. A method as claimed in claim 18, wherein said network requirements comprise capacity requirements.

21. A method as claimed in claim 1, wherein said first station is a mobile station.

22. A method as claimed in claim 1, wherein said second station is a base transceiver station.

23. A method as claimed in claim 1, wherein said wireless communication network uses code division multiple access.

24. A method as claimed in claim 1, wherein said wireless communication network uses time division multiple access.

25. A method determining the availability of at least one of a plurality of different services in a wireless communication network comprising at least a first station and a second station which are in communication, said method comprising the steps of:

estimating the pathloss between said first station and said second station, and based on said pathloss and the requirements of at least one of said services, determining the power with which said first station is required to transmit to said second station;

comparing said required power with the maximum power with which the first station is capable of transmitting; and determining the availability of services from the maximum power by determining the greatest level of service which can be provided.

26. A method of determining the availability of at least one of a plurality of different services in a wireless communication network comprising at least a first station and a second station which are in communication, said method comprising the step of:

estimating the interference in the signal transmitted between said first station and second station, and based on the interference and the requirements of at least one of said services determining the power with which said first station is required to transmit to said second station;

comparing said required power with the maximum power with which the first station is capable of transmitting; and determining the availability of services from the maximum power by determining the greatest level of service which can be provided.

* * * * *